United States Patent [19]

James

[11] 4,222,298

[45] Sep. 16, 1980

[54] CUTTING TOOL OR THE LIKE

[76] Inventor: Vaughn F. James, 19430-84th Ave. S., Kent, Wash. 98031

[21] Appl. No.: 949,808

[22] Filed: Oct. 10, 1978

Related U.S. Application Data

[63] Continuation of Ser. No. 767,206, Feb. 9, 1977, abandoned, which is a continuation-in-part of Ser. No. 630,273, Nov. 10, 1975, abandoned.

[51] Int. Cl.³ .................... B23D 57/00; B27G 13/00; B26D 1/12
[52] U.S. Cl. ........................................ 83/853; 83/855; 144/218; 407/62; 407/113; 407/114
[58] Field of Search .................. 83/855, 853; 144/218; 407/30, 40, 42, 47, 48, 50, 51, 56, 61, 62

[56] References Cited

U.S. PATENT DOCUMENTS

| 104,055 | 6/1870 | Munro et al. | 407/61 |
| 1,361,305 | 12/1920 | Buck | 144/218 |
| 2,736,352 | 2/1956 | Wright | 83/853 |
| 2,903,782 | 9/1959 | Cowley | 407/30 |
| 3,213,716 | 10/1965 | Getts | 29/105 R |
| 3,730,038 | 5/1973 | Farb | 83/855 |

FOREIGN PATENT DOCUMENTS

| 22006 | 11/1905 | Austria | 407/40 |
| 386506 | 12/1923 | Fed. Rep. of Germany | 407/48 |
| 1200 | of 1894 | United Kingdom | 407/40 |
| 587854 | 5/1947 | United Kingdom | 407/42 |
| 795993 | 6/1958 | United Kingdom | 407/48 |
| 991746 | 5/1965 | United Kingdom | 407/40 |

Primary Examiner—Harrison L. Hinson
Attorney, Agent, or Firm—Cole, Jensen & Puntigam

[57] ABSTRACT

A circular saw blade having mounted on the outer circumference thereof a plurality of spaced conical teeth in lobes separated by aerodynamically designed gullets. The teeth are integral portions of elongated shafts and the axis of the elongated shaft is mounted at a slight angle from the perpendicular to a radius of the blade itself. The gullet is of a configuration wherein the turbulence created by the blade moving rapidly through the air generates an outward flow of air removing the particulate waste generated thereby eliminating clogging and the resultant friction.

5 Claims, 10 Drawing Figures

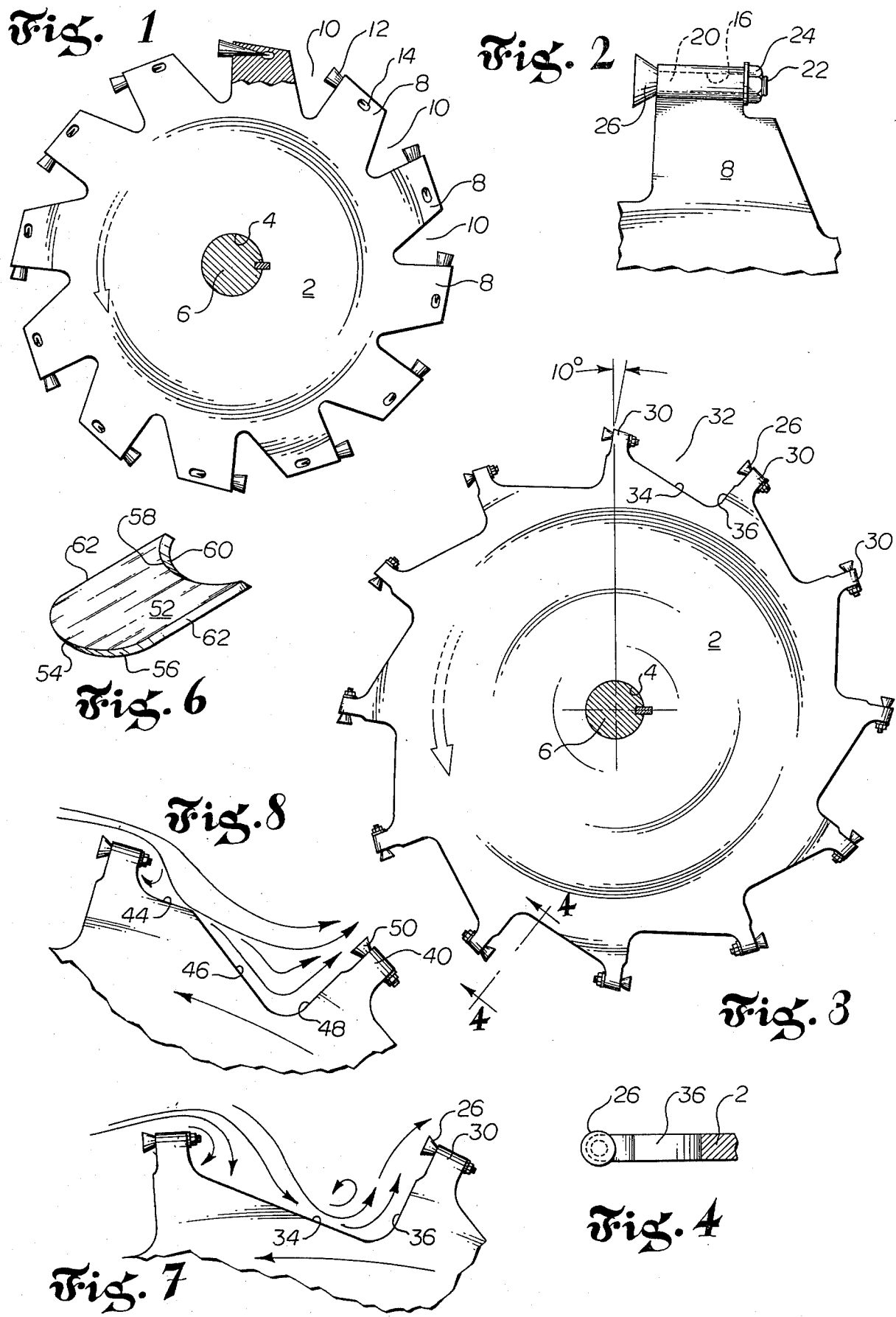

CUTTING TOOL OR THE LIKE

This application is a continuation of application Ser. No. 767,206, filed Feb. 9, 1977, now abandoned, which is a continuation-in-part of U.S. application Ser. No. 630,273 filed Nov. 10, 1975, now abandoned.

BACKGROUND OF THE INVENTION

The art of wood cutting is well developed and has made several progressive steps over the years. The majority of wood cutting, however, is still done with a flat circular blade having a plurality of teeth and rake members at the outer periphery. The teeth are inclined outwardly from the blade, a configuration known as "set", such that when they cut through the wood, the blade passes through a kerf which is wider than the blade is thick. The rake members are interspersed between cutting members to remove the particles severed by the cutting teeth, however, it has been found that the material which is removed by the cutting teeth tends to be of a dust form, i.e. sawdust, and the granular members tend to cake within the open portions between the teeth and the rake member. This clogging or buildup increases the friction between the blade and the wood while further containing the heat, detrimentally affecting the blade.

Another aspect of the currently used saw blades lies in the fact that the blades tend to become dull at a very rapid rate. The teeth become dull, their cutting edges become rounded thereby causing even more drag and more sawdust which inhibits the cutting operation and require a greater amount of power to accomplish the task.

In an attempt to relieve some of the problems noted hereinabove, it is proposed that the standard circular saw blade be altered to the extent that the cutting elements be conical teeth mounted to lobes forming a part of the saw blade, thereby eliminating the need for a set upon the blade and resulting in a narrower kerf and, as explained hereinafter, less drag. As the size of the blade gets larger i.e. when used for lumber mill operations, the amount of material which can be saved by a narrower kerf becomes substantial. Further, it is important to note, as will be pointed out in greater detail hereinafter, the utilization of a different saw blade and in particular one having conical teeth results in a different grade of waste i.e. one which may be used for particle board or the like.

An important aspect of sawing of course, is to keep the men and machines operational as much of the time as possible. When a machine must be shutdown to remove a dull blade and replace it or sharpen it in position, there is a substantial loss production time. With the introduction of a blade which has conical teeth which retain their sharpness for a greater period of time, there will be far less down time and thus greater production. Further the introduction of a blade which has reduced friction requires a smaller motor and less energy to saw logs and/or boards or in the alternative the log and/or board may be fed through the saw at a more rapid rate with a similar power consumption. With the above noted prior art and problems in mind, it is an object of the present invention to provide a new and unique saw blade wherein the saw kerf is narrower and wherein the waste product is particularized and thereby utilizable in particle board or the like.

It is another object of the present invention to provide a saw blade wherein the blade generates an outward flow of air which clears the waste product from the blade and from the kerf prior to it being reintroduced and jammed in the cut generating drag and friction.

Still another object of the present invention is to provide a unique saw blade wherein the cutting is actually done by a plurality of conical cutting elements which contact the substance being cut at an angle and thus serve to slice the material rather than impact it relieving internal stress and aiding the operation.

Still another object of the present invention is to provide a circular saw blade wherein the aerodynamics generated by the blade moving through the air creates an outward flow of air from the base of the gullet passing by the front of the tooth rendering the saw self-cleaning.

Still a further object of the present invention is to provide a saw blade wherein the cutting teeth can be quickly and easily replaced without necessitating of down time on the machine.

Still a further object of the present invention is to provide a saw blade wherein the entire blade need not be removed in the event of damage of one or two of the teeth and these teeth can be quickly and easily replaced while the saw is in position.

BRIEF DESCRIPTION OF THE DRAWING

FIG. 1 is an elevational view of one embodiment of circular saw blade incorporating conical teeth.

FIG. 2 is an enlarged portion of a circular saw blade including thereon an alternate tooth form as well as an alternate mounting therefore.

FIG. 3 is another embodiment of a circular saw blade utilizing conical teeth.

FIG. 4 is a view taken along lines 4—4 of FIG. 3 showing the conical tooth and mounting therefore.

FIG. 6 is an enlarged view of a typical chip formed by the utilization of conical teeth in the described circular saw blades.

FIG. 7 is an enlarged view of a gullet portion of the saw blade of FIG. 3 showing the airflow therein.

FIG. 8 is an enlarged view of the gullet portion of the saw blade of FIG. 5 showing the airflow therein.

DETAILED DESCRIPTION OF THE DRAWINGS

Figure 5:
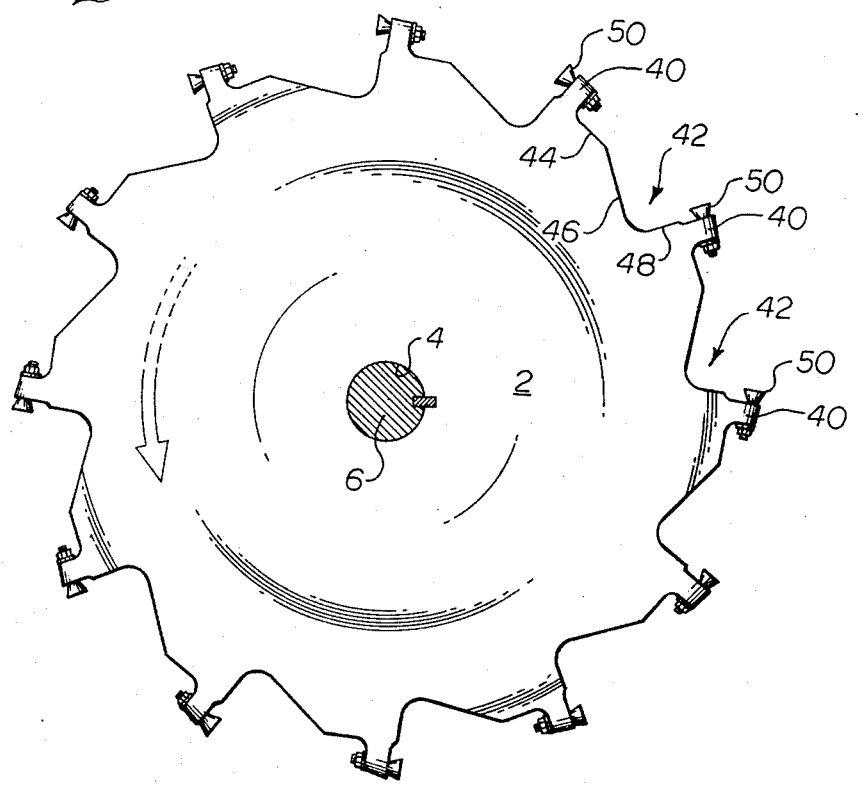
FIG. 5 is an elevational view of yet another embodiment of a circular saw blade utilizing conical teeth.

As seen in FIG. 1, the circular saw blade has a generally circular flat body portion 2 having a central bore 4 for mounting upon a driven shaft 6 and for movement therewith. The outer periphery of the blade has a plurality of lobes 8, interspersed by a plurality of gullets 10. The lobes 8 each have a conical tooth 12 mounted therein and each having a tapered shaft for friction fit within a complementary bore. Also seen in this view are ports 14 permitting the insertion of a tool permitting the rapid extraction of the teeth 12.

As seen in FIG. 2 an alternate lobe 8 is shown wherein the outer end of the lobe includes cylindrical bore 16 for receiving a cylindrical shaft 20 upon which a conical cutting head 22 is mounted. The after end of the shaft 20 includes a threaded portion 22 to receive a securing nut 24. Thus, as can be seen, the tooth is secured in position for use and yet may easily be extracted for sharpening or replacement. It is important to note that the bore of the cutting tooth is as described in greater detail hereinafter, solidly seated against the lobe. Further, the axis of the conical shaft is at a slight angle to a line perpendicular to a radius passing through the front of the lobe as explained hereinafter.

Another embodiment of the present invention includes a main circular disk shaped body member 2 having a central bore 4 for mounting upon a driven shaft 6 and also includes a plurality of lobes 30 separated by gullets 32 which, as can be seen, have essentially flat bottom portions 34 and flat, angled rear edge portions 36 which are at an angle of approximately 10° from the radius passing therethrough. The cylindrical shaft of the conical tooth, as illustrated in FIG. 2, is mounted perpendicular to the plane of the rear face 36 of the gullet thereby causing the tooth to contact the work piece at a slight angle slicing through the fibers rather than compressing them. Slicing through the fibers serves to relieve the internal tension of the material being cut as well as resulting in a plurality of chips as waste rather than sawdust as explained hereinafter.

As seen in FIG. 4, the face 26 or conical cutting portion of the tooth extends slightly outwardly beyond the width of the saw blade 2 and thus defines a kerf giving adequate clearance for the blade. It is important to note at this point, and as well be explained in greater detail, the chips which are formed are automatically blown from the saw blade and from the kerf. The saw blade is thus kept clean and clear of impediments at all times reducing the friction. The fact that the chips are continuously removed results in a blade which needs less clearance to function economically, saving in material and requiring substantially less power to drive.

As seen in FIG. 5, yet another embodiment of the conical circular saw blade can be seen having a circular shaped body portion 2 with a central bore 4 mounted on a driven shaft 6 and includes a plurality of lobes 40 separated by a plurality of gullets 42. It is important to note that in this particular embodiment the gullet 42 is irregular in profile, having a rearwardly extending portion 44 approximately perpendicular to the lobe immediately behind the lobe 40 and then a second portion 46 which is angled toward the center of the saw blade creating a deeper gullet portion. An outwardly angled flat portion 48 follows portion 46 and as explained with respect to FIG. 3, will be at an angle of about 10° to a radius and serve as a support for the cutting tooth 50. As will be explained in greater detail hereinafter, the movement of the blade through the air generates air currents and turbulence adjacent the tooth, removing the chip from the gullet and resulting in a clean, substantially frictionless cut.

Reference is now had to FIG. 6 wherein a typical chip 52, a typical waste product of the cutting tool is seen. The chip 52 has a main body portion and a curved leading portion 54 having an angled face 56 and a congruently curved rear portion 58 having an angled face 60. The curved portions 54, 58 are joined by essentially straight side portions 62. Although it is granted there is a small amount of sawdust, substantially all of the waste material which results from the cutting process will be chips of a nature as shown in the drawing. The chips would typically have a particle size of approximately ½ centimeter in width and a little over ½ centimeter in length. It is important to note that the waste product of the present invention has several advantages. Firstly the waste product is of a size and weight that it may be easily blown from within the gullet as explained hereinafter and secondly the product is of such a size that it may be used in secondary products such as particle board thereby resulting in almost a zero waste operation.

Referring now in particular to FIG. 7, the flat base portion 34 as well as the flat face portion on the lobe 30 are as depicted in FIG. 3 and as shown here the air current caused by the blade moving through the air and shown by the arrows generates an outward flow along the front of the cutting tooth 26. The outward flow exhausts all of the particles, preventing buildup within the gullet which, as explained hereinabove, causes greater friction and drag.

Referring now to FIG. 8, the gullet configuration is that as shown in FIG. 5 having a first flat portion 44 and an angled flat portion 46 followed by a flat face portion 48 leading into the lobe 40 supporting the cutting tooth 50. As seen in this view, the air current passes over the leading lobe, is drawn downwardly at an increased flow rate where it contacts the surface 44 and swoops upwardly causing a general outward flow by the fact of the tooth 40. The remainder of the air is drawn down into the lower portion of the gullet and abuts against the face 48 creating an aerodynamic burble or high pressure area preventing the chips from collecting in this area.

Figure 9:
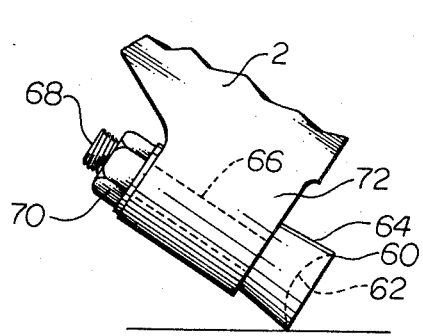
FIG. 9 is an enlarged view of one form of conical tooth capable of utilization with the present invention.

The tooth which is depicted in each of the alternate embodiments is shown on a large scale in FIG. 9 and includes a cutting edge 60 which is circular in plan view, as seen in FIG. 4, and has a conical center portion 62. The conical portion serves to scoop the material from the piece being cut. The sides 64 of the tooth are at an angle of approximately 5° to the axis of the shaft which, as noted above, terminates in the threaded portion 68 and held in position by means of a nut 70. Also seen in this view is the lobe 72 which is an integral part of the main body portion 2.

Figure 10:
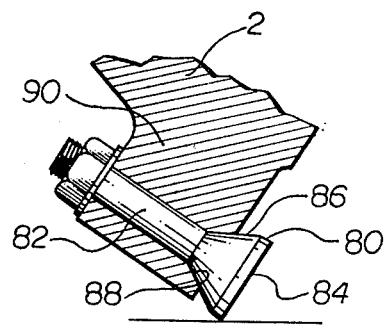
FIG. 10 is an enlarged view of another form of the conical tooth capable of utilization with the present invention.

Referring now to FIG. 10, another configuration of the cutting tool may be seen wherein the cutting edge 80 is about 5° to the axis of the shaft 82 and is immediately adjacent the cutting face 84. Tapering rearwardly from the cutting edge 80 is the supporting conical portion 86 which is at an angle of about 60° to the shaft 82 and is seated within a complementary conical bore 88 thus transferring any shock and stress directly to the lobe 90, an integral part of the blade main portion 2.

Thus as can be seen, the conical tooth actually contacts a surface of the piece being cut at a slight angle scoops the material outwardly where it is picked up by the air currents and blown out of both the gullet and the kerf resulting in a cut which is cleaner. The waste material is reusable and the operation has a much lower power requirement because of the reduced friction. The cutting action of the blade on the material is more of a slicing action then a chipping action, reducing internal stress as compared to the force required and stresses generated in a typical impact situation.

What is claimed is:

1. A circular saw blade for use in cutting fibrous material requiring less driving force and generating less heat during operation, comprising:
a generally flat disk-like main body member having a pair of parallel sides and a central bore to receive a driven shaft which causes said blade to rotate about its axis, said disk-like main body portion comprising:

a plurality of radially outwardly extending lobes separate by gullets upon which cutting teeth are mounted, each of said lobes including a leading edge, facing in the direction of blade rotation, said leading edge having a first flat surface at its outer end to support a tooth and a second flat surface extending generally radially inwardly therefrom, said first flat surface lying in a first plane perpendicular to the sides of the main body at an angle to a second plane perpendicular to the sides of the main body member, containing a radius of the main body member and passing through the bottom of the lobe such that the first plane is parallel to the axis of the rotation of the blade and non-coplanar with the second plane but intersecting said second plane radially inwardly from the first flat surface, each gullet having a leading and a following end between each pair of adjacent lobes, and being of a size and shape to cause increased air flow radially outwardly across the leading edge of the following lobe and across the face of the tooth mounted thereon, each of said teeth having a conically dished cutting face of a size such that it does not cover the entire first flat surface and rearwardly extending mounting shaft, each of said teeth mounted toward the outer limits of the leading edge of the lobe within the first flat area and having the cutting face which extends radially outwardly of the first flat surface but leaves the radially inwardmost portion of the flat surface unobstructed, allowing the air to expand as it passes thereby, increasing velocity and assuring constant turbulent, cooling and cleaning airflow past the cutting face of each tooth.

2. A saw blade as in claim 1, wherein the gullet is wider than it is deep and has a substantially planar bottom surface.

3. A saw blade as in claim 1 or 2, wherein the gullet slopes radially inwardly from its leading to its following end.

4. A saw blade as in claim 1, 2 or 3, wherein the tooth rests against the first flat surface of the lobe.

5. A saw blade as in claim 1, 2 or 3, wherein the tooth includes a conical exterior surface adjacent the shaft and is mounted in a complimentary bore in the lobe whereby the stress of cutting is transferred directly to the lobe.

* * * * *